United States Patent [19]

Halberstadt et al.

[11] 4,035,554

[45] July 12, 1977

[54] SELF PUMPING ELECTROCHEMICAL CELL

[75] Inventors: Harry J. Halberstadt, Los Altos; Leroy S. Rowley, San Jose, both of Calif.

[73] Assignee: Lockheed Missiles & Space Company, Inc., Sunnyvale, Calif.

[21] Appl. No.: 649,591

[22] Filed: Jan. 16, 1976

Related U.S. Application Data

[63] Continuation of Ser. No. 494,929, Aug. 5, 1974, abandoned.

[51] Int. Cl.² .................................... H01M 6/04
[52] U.S. Cl. ............................... 429/80; 429/81; 429/94; 429/149
[58] Field of Search ............ 429/51, 94, 105, 122, 429/188, 207, 72, 63, 218, 80, 81

[56] References Cited

U.S. PATENT DOCUMENTS

| | | | |
|---|---|---|---|
| 3,043,898 | 7/1962 | Miller et al. | 429/27 |
| 3,281,275 | 10/1966 | Levine et al. | 429/44 |
| 3,496,021 | 2/1970 | Haefling | 429/40 |
| 3,791,871 | 2/1974 | Rowley | 429/122 X |

*Primary Examiner*—Anthony Skapars
*Attorney, Agent, or Firm*—Richard H. Bryer; Billy G. Corber

[57] ABSTRACT

In a reactive metal-water electrochemical cell, a configuration utilizing waste heat and evolved hydrogen gas for pumping electrolyte through the cell. More particularly, the cell is in a vertical, hollow tubular configuration with the reactive anode being bonded to the interior surface of the tube casing and a coiled metal screen cathode being positioned within the tubular cell and containing the anode over essentially its full working surface. As the anode is consumed in operation, by reaction with an aqueous electrolyte filling the interior cavity of the tubular configuration, the coil configuration of the cathode forces it to expand and maintain contact with the anode. During operation, evolved waste heat and gas cause a flow of electrolyte through the interior of the cell.

2 Claims, 2 Drawing Figures

U.S. Patent
July 12, 1977
4,035,554
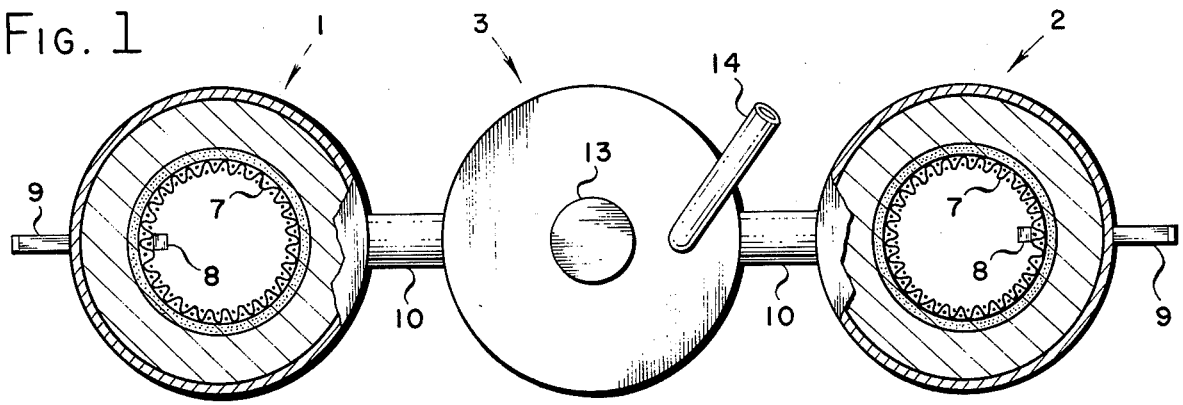
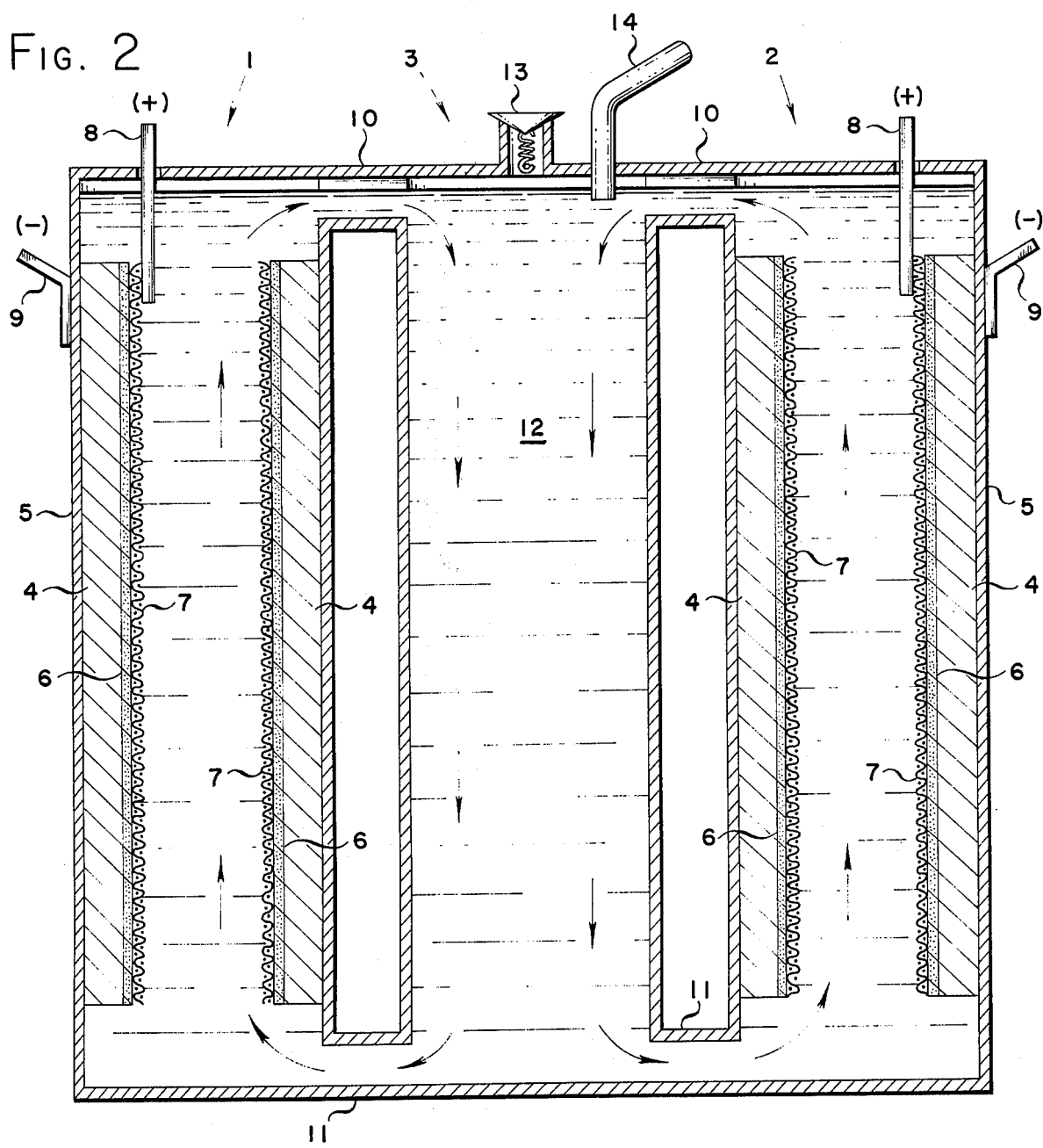

SELF PUMPING ELECTROCHEMICAL CELL

This is a continuation of application Ser. No. 494,929 filed Aug. 5, 1974, now abandoned.

BACKGROUND OF THE INVENTION

This application describes and claims certain improvements in the basic electrochemical cell disclosed in United States patent 3,791,871.

The basic mechanism of the cell described in the aforementioned patent is incorporated by reference in this application. Briefly, the cell utilizes a reactive metal anode highly reactive with a aqueous electrolyte and spaced from the cathode by an electrically insulating film which forms naturally on the anode in the presence of water. This thin film permits the cathode to be placed in direct contact with the anode. The resulting reduction in the anode-cathode spacing to a thickness no greater than the thickness of this film greatly reduces the $I^2 R$ losses which would otherwise be present and results in increased power output and energy density. The anode and cathode operate in an aqueous electrolyte which supports the beneficial electrochemical reaction. As disclosed in co-pending U.S. Pat. application Ser. No. 443,905, the cathode is beneficially formed of an open-mesh metallic screen contoured to contact the anode over substantially the entire operating surface.

During operation of the cell, molarity of the electrolyte increases with a resulting decrease in power output. Further, excess heat must be removed from the electrolyte which would otherwise result in a loss of efficiency. Likewise, depolarization of the cell must be accomplished by removal of hydrogen gas evolved at the cathode. Accordingly, the electrolyte is normally pumped through the cell in order to remove heat, bring in additional oxidant to maintain desired molarity and remove hydrogen. The use of mechanical pumps and heat exchangers for this purpose are cumbersome, consume power and generate noise, all of which are undesirable.

SUMMARY OF THE INVENTION

Briefly, in accordance with the invention, there is described a configuration which dispenses with the necessity of mechanical pumps and heat exchangers and, by use of the products of the electrochemical reaction, is self-pumping, the pumping force being supplied by the waste heat and hydrogen gas evolved. The configuration has the further advantage of reducing non-working anode edge surfaces which would normally be exposed to the electrolyte and therefore subject to parasitic erosion.

More particularly, in accordance with the invention, a reactive anode is bonded to the interior surface of a tubular casing and a coiled metal screen cathode is positioned within the casing. The coiled screen presses continuously against the working surface of the anode during the lifetime of the battery. The circular construction of the anode does not provide any non-working exposed edges other than the small top and bottom seams at the ends of the tube and parasitic erosion is accordingly minimized. During operation, reaction of the lithium with the electrolyte in the interior cavity of the casing causes the electrolyte to be heated thereby establishing a thermal gradient in the cell. This gradient and the buoyancy of the hydrogen gas evolved at the cathode creates a flow of electrolyte through the cell, with hot electrolyte containing hydrogen gas exiting from the top of the cell and fresh oxidant being drawn into the bottom of the cell.

DESCRIPTION OF THE DRAWING

The various features and advantages of the invention will become apparent upon consideration of the following description taken in conjunction with the accompanying drawing of the preferred embodiment of the invention. The views of the drawing are as follows:

FIG. 1 is a top view of two self-pumping cells of the invention operating from a common reservoir; and FIG. 2 is a edge cross-sectional view of the cells of FIG. 1.

DESCRIPTION OF THE PREFERRED EMBODIMENT

With reference to FIGS. 1 and 2, where like reference characters designate corresponding parts throughout the several views, there is depicted two cells of the invention 1 and 2 operating, in this embodiment, from a common reservoir 3. Reactive metal anodes 4 are bonded, for example by metalurgical means, to the inside walls of the tubular metal casings 5. The insulating film 6 which forms naturally on anodes 4 electrically separates anodes 4 from expanding coiled metal screen cathodes 7. As the anode 4 is consumed in operation, the cathode 7 expands to maintain contact with the anode. A cathode current collector 8 is bonded to each screen cathode 7 and an anode connector 9 is bonded to the exterior of each cell casing 5.

In the embodiment shown in the drawing, two cells 1 and 2 are connected to a central reservoir 3 by means of pipes 10 and 11. The upper pipes 10 are for egress of the circulating electrolyte 12 and the lower pipes 11 are for ingress of the electrolyte into the cells. To enhance rejection of heat to the environment the depicted cells and central reservoir may be immersed in a liquid bath such as water. If the liquid bath is an electrically conducting fluid, the exterior surfaces of metal casings (5) are electrically insulated, for example, with an insulating epoxy paint, not shown. Naturally, there may be only one or more than two cells connected to a central reservoir instead of the two cells depicted in the drawing.

As the cells operate, the electrolyte 12 circulates down through the reservoir 3 as it cools and evolves the entrained hydrogen and enters the cells 1 and 2 by way of pipes 11. Evolved hydrogen is vented through relief valve 13. Oxidant, normally water, is admitted through inlet pipe 14 as required to keep the cells operating at the desired power level.

As discussed in U.S. Pat. No. 3,791,871, molarity of the electrolyte is varied to control power output of the cells. Whereas conventional batteries decline in both voltage and power during discharge reaching a point of unacceptable low voltage before the active materials are consumed, voltage and power in the cells of the invention are maintained at the desired level throughout the life of the anode. The voltage and power output per unit area of cells of the invention are primarily dependent on electrolyte concentration and temperature. The temperature is maintained relatively constant by the configuration of the cells of the invention. Accordingly, control of voltage and power is accomplished by varying the molarity of the electrolyte. During operation, the cells of the invention produce a reactive metal hydroxide at the anode which tends to reduce power output as the concentration exceeds in optimum molarity which can be readily calibrated. Accordingly, an oxidant, typically water, is added to the electrolyte to control molarity, that is, reduce the hydroxide concentration. The control function used to control power output is total cell voltage. Variations of voltage above or below the desired level is sensed by an electronic sensor which actuates a solenoid value which in turn controls the rate of water addition through pipe 14 to the electrolyte. Excess electrolyte generated by such oxidant additions are vented through valve 13.

Anode 4 is formed of a reactive metal such as sodium or lithium which is highly reacting with and in the presence of water naturally forms on its surface a protective insulating film. Alloys and compounds of such alkali metals and other reactive metals should be equally feasible for use as the anode provided they are substantially as reactive with water as are sodium and lithium and further provided, in common with sodium and lithium, they naturally form a continuous insulating film in the presence of water. As discussed in aforementioned U.S. Pat. application Ser. No. 443,905, the open-mesh screen cathode is of any suitable electrically conductive material which is non-reactive with water and will permit electrochemical reduction of water during operation of the cell. Illustratively, iron and nickel are preferred materials with black platinum and black nickel providing increased efficiency at the expense of high cost and reduced durability. The minimum size of the screen is governed by the need to get electrolyte to the anode face plus the need to remove the products of reaction away from the face. The maximum screen size is governed by the desire to keep all parts of the anode face as near as possible to the cathode. Illustratively, for an anode surface measuring 5 inches by 11 inches, a metal screens with 0.003 inch metal and 0.1 inch by 0.05 inch openings has produced excellent results.

During operation, the cells of the invention produce a metal hydroxide, the particular metal being dependent on the composition of the anode. Accordingly, for ease of operation, the aqueous electrolyte is preferable the same as that produced by the reactive metal-water reaction. However, any one of a number of other aqueous solutions should be equally feasible as a starting electrolyte provided such electrolytes have the requisite film forming characteristics. When dry storage is desired the reservoir 3 may be filled with appropriate dry electrolytes such as lithium hydroxide monohydrate and the cell activated by the introduction of water into the reservoir.

While a central reservoir is not required for single or multiple cell operation, it is considered desirable for multiple cell operation in that the reservoir contributes to maintaining electrical balance between multiple cells by providing all cells with electrolyte of equal molarity and temperature.

Illustratively, four tubular cells, 6 inches long and 1 inch in diameter, containing one-eighth inch of lithium bonded to the inner walls of each tube for a length of 5½ inches, were operated connected to a central reservoir containing 1.0 molar lithium hydroxide solution in LiCl for two hours at a power level of 50 watts. The temperature of the electrolyte was 28° C and the unit was operated in aqueous media at a temperature of 25° C.

What is claimed is:

1. A self-pumping reactive metal anode-aqueous electrolyte electrochemical cell consisting essentially of a vertical hollow tubular casing, a reactive anode bonded to the interior surface of said casing, said anode naturally forming on its surface a protective insulating film in the presence of water, an expandable coiled metal open-mesh screen cathode positioned within the interior of said tubular casing and contacting said insulating film over substantially all of the anode surface facing said cathode, said cathode pressing continuously against said insulating film during operation of said cell, and an aqueous electrolyte flowing through and filling the interior cavity of said hollow tubular casing, said electrolyte flow from the bottom to the top of said cell being caused solely by evolved heat and gas generated during the operation of said cell.

2. A plurality of electrochemical cells in accordance with claim 1 wherein said cells are connected to a common electrolyte reservoir.

* * * * *